E. W. BURGESS.
GRAIN SHOCK LOADER.
APPLICATION FILED NOV. 13, 1915.

1,385,939.

Patented July 26, 1921.
3 SHEETS—SHEET 1.

Inventor.
Edward W. Burgess.
By Chas. E. Lord
Atty.

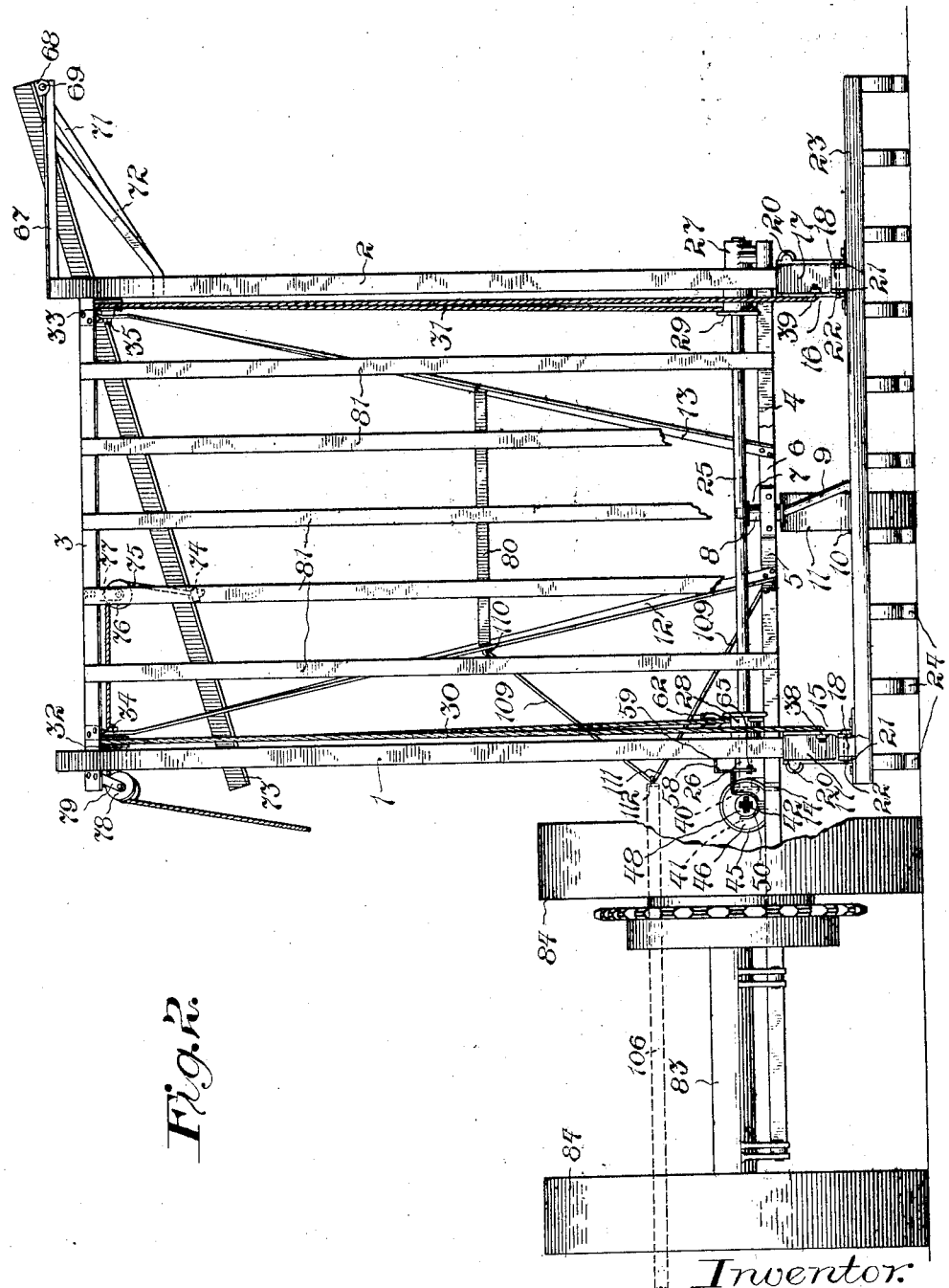

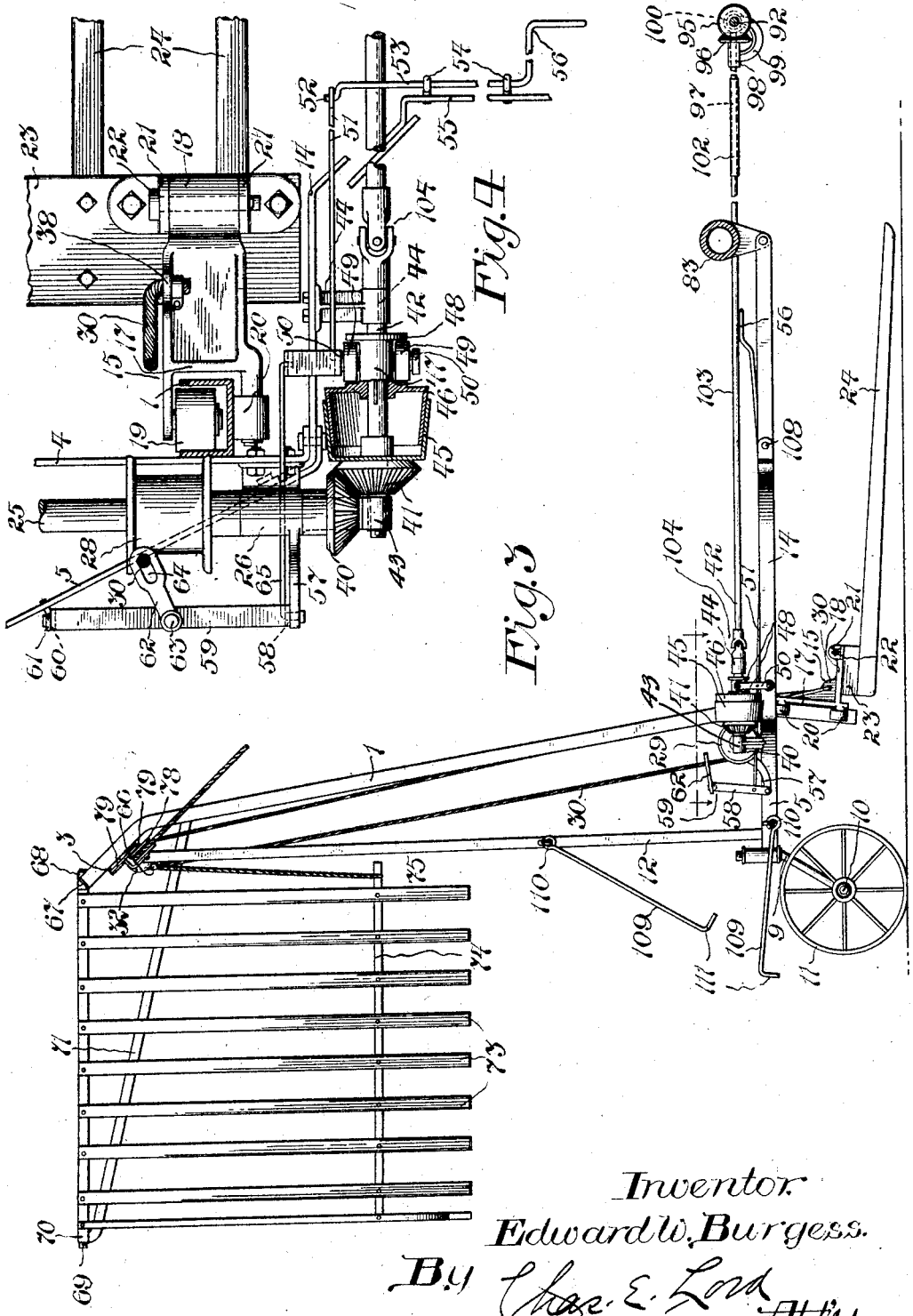

UNITED STATES PATENT OFFICE.

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

GRAIN-SHOCK LOADER.

1,385,939.  Specification of Letters Patent.  Patented July 26, 1921.

Application filed November 13, 1915. Serial No. 61,404.

*To all whom it may concern:*

Be it known that I, EDWARD W. BURGESS, a citizen of the United States, residing at Chicago, in the county of Cook and State of Illinois, have invented certain new and useful Improvements in Grain-Shock Loaders, of which the following is a full, clear, and exact specification.

My invention relates to grain shock loaders adapted to be drawn at the side of a wagon and rack and adapted to intermittently engage a shock and raise it to a predetermined height and to automatically dump it upon a deflecting cradle that directs it to the receiving rack.

The objects of the invention are to obtain an improved draft relationship for associated units, the same being accomplished by providing a shock loader adapted to be drawn by a tractor in trailing relation at one side of a trailing wagon, which also is drawn by the tractor; to improve driving means and connections by providing means whereby the operative parts of the loader are coupled with the power transmission gearing of the tractor in a manner to avoid the use of any tractive power elements in the loader structure; to improve control features by providing means whereby the operator may control the loader mechanism from his seat upon the tractor, and to improve connections by providing means for detachably and flexibly connecting the frame of the loader with the rack and with the draft frame of the tractor.

These objects are attained by means of the mechanism representing one embodiment of my invention and illustrated by the accompanying drawings, in which—

Fig. 2 is a front elevation of the loader on an enlarged scale and a part of the tractor;

Fig. 3 is a side elevation of the loader looking from the right in Fig. 1; and

Fig. 4 is a sectional plan view on an enlarged scale of part of Fig. 3 looking in the direction of the arrows.

Figure 1:
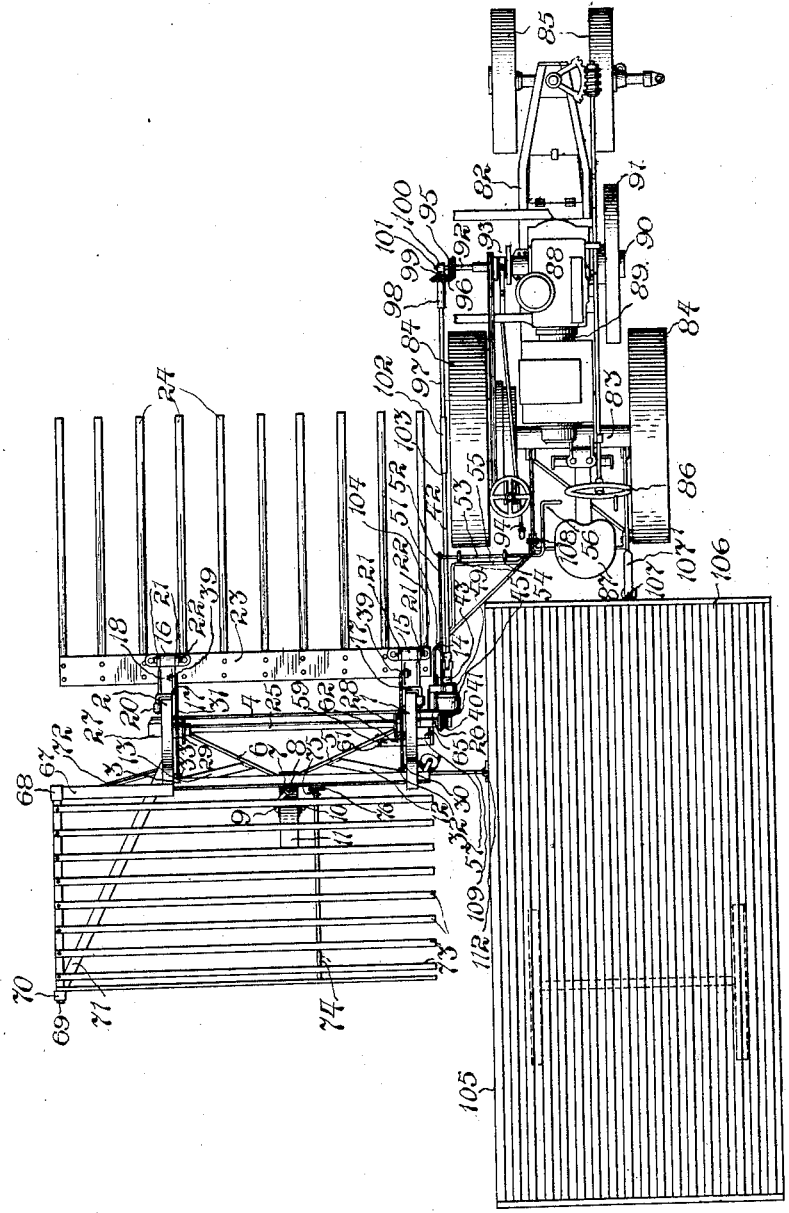
Figure 1 is a top plan view of a tractor and trailing wagon and rack and a trailing loader at one side of the wagon and embodying my invention.

Referring to the drawings, wherein the same reference numerals designate like parts throughout the several views, the frame of the loader includes inside and outside upwardly and rearwardly inclined channel bars 1 and 2, respectively, disposed parallel with each other, and 3 represents a transverse bar secured to their upper ends, and 4 a transverse bar secured to their lower ends. 5 and 6 represent inside and outside rearwardly converging frame members having their front ends secured to opposite ends of the bar 4 and their rear ends to a bracket member 7 including a vertically disposed sleeve 8, in which is journaled the upper end of an arm 9 having a horizontally disposed axle portion 10 at its lower end, upon which is journaled a caster wheel 11, and 12 and 13 represents supplemental frame members having their lower ends secured to the rear ends of the bars 5 and 6, respectively, and their upper ends to the opposite ends of the transverse bar 3. 14 represents a forwardly and laterally extending draft member having its rear end secured to the frame members 4 and 5 and its front end provided with an opening whereby it may be connected with the draft frame of a tractor. 15 and 16 represent bracket members adapted to be drawn along the channel bars 1 and 2, respectively, and including arms 17 and 18 disposed vertically and horizontally, respectively, the vertical arms having rollers 19 journaled upon their opposite ends and adapted to travel between the inwardly extending webs of the channel bars and other rollers 20 adapted to travel upon the outside webs of said bars, and the front ends of the arms 18 are pivotally connected with ear members 21 by means of pins 22, the ear members being secured to a transversely disposed fork head 23 having a series of forwardly extending tines 24 secured thereto. The lower ends of the channel bars 1 and 2 are disposed at an angle and rearwardly from the vertical in a manner to support the fork head at a distance from the ground and permit the points of the tines to run close to the ground, the hinge connection between the head and the arms 18 of the bracket members 15 and 16 permitting the tines to ride over obstructions and limiting a swinging movement of the fork in an opposite direction.

25 represents a transverse shaft journaled in inside and outside bearings 26 and 27, respectively, secured to the frame member 4, and 28 and 29 represent winding drums secured to the shaft adjacent the bearings 26 and 27, respectively. 30 and 31 represent cables having one end secured to the drums 28 and 29, respectively, and are led upward and over sheaves 32 and 33, respectively, that are journaled upon studs 34 and 35, respectively, carried by bracket members 36 and 37, respectively, secured to the transverse bar 3, and then downward and have their opposite ends secured to eye members 38 and 39 integral with the bracket members 15 and 16, respectively.

Means are provided for rotating the shaft 25 in a direction to wind the cables upon the drums including a bevel pinion 40 secured to the inner end of the shaft and meshing with a corresponding pinion 41 secured to the rear end of a longitudinally disposed shaft 42 journaled in a bearing 43 preferably integral with the bearing member 26 and having its front end journaled in a bearing member 44 secured to the draft member 14. 45 represents a cone friction clutch member preferably integral with the pinion 41, and 46 a complemental clutch member splined upon the shaft 42 and having its hub 47 provided with collars 48 that receive between them rollers 49 journaled upon a clutch shifting fork 50 pivotally mounted upon the draft member 14 and having a link 51 connecting it with an arm 52 upon the outside end of a rock shaft 53 journaled in bearings 54 secured to a bracket member 55, which is secured to the draft member 14, the opposite end of the rock shaft being provided with a forwardly extending crank arm 56 within convenient reach of the operator's foot, whereby he may control the operation of the clutch mechanism. 57 represents a rearwardly extending arm integral with the bearing member 26, and journaled thereon is a depending leg member 58 forming part of a U-shaped member 59 disposed transversely of the machine and having its remaining leg 60 journaled in an eye member 61 secured to the frame member 5. 62 represents a lever having its rear end pivotally mounted upon a stud 63 secured to the middle part of the U-shaped frame member 59 and its front end provided with a slotted opening 64 that receives the cable 30. The leg 58 is connected with the clutch shifting fork 50 by means of a link 65 whereby the clutch members are positively disengaged when the U-shaped member 59 is rocked forward by means of a button 66 secured to the cable 30 and engaging with the lever 62 when the shock lifting fork has been elevated to a load dumping position.

A part of the upper ends of the channel bars 1 and 2, having a length approximately equal to that of the fork carrying bracket members 15 and 16, is inclined rearward for the purpose of tilting the fork upward and rearward as it reaches the limit of its upward travel. 67 represents a frame member secured to the upper end of the channel bar 2 and extending horizontally outward therefrom and provided with a bearing member 70 68, in which is journaled the front end of a longitudinally disposed bar 69, having its rear end journaled in a bearing member 70 secured to the rear upper end of a diagonally disposed frame member 71, having its front end secured to the channel bar 2, and 72 represents a brace member connecting the frame member 67 with the channel bar 2. The bar 69 is adapted to rock in its supporting bearings, and secured thereto are the ends of a series of spaced slats 73, the opposite ends of the slats being secured to a cross bar 74, the whole forming an inclined cradle adapted to receive the load dumped from the fork and direct it toward the wagon and rack. A rope 75 has one end secured to the front end of the cross bar 74 and leads upward over a sheave 76 journaled in a bracket member 77 secured to the middle part of the transverse frame member 3. The rope then leads forwardly and passes over a sheave 78 journaled in a bracket member 79 secured to the extended end of the bar 3, and then the rope extends to within convenient reach of the operator of the tractor, whereby the dumping angle of the receiving cradle may be controlled.

80 represents a transverse frame member having its opposite ends secured to the frame members 12 and 13, and 81 a series of slats secured to the frame members 30, 80 and 4 and acting as guards to prevent the load upon the fork from tipping rearwardly as it is being elevated.

The tractor includes a truck frame 82, having its rear end supported by an axle 83, having traction wheels 84 mounted thereon, and its front end carried by steering wheels 85 that are controlled by means of a hand wheel 86 convenient to an operator in the seat 87. 88 represents the engine including a cylinder 89, power shaft 90 and fly wheel 91. The power transmission gearing between the engine and traction wheels may be the same as that shown in my application for patent filed September 22, 1915, Serial No. 52,098, and includes an auxiliary countershaft 92 journaled upon the truck frame below the power shaft and controlled by a clutch mechanism 93 carried by the countershaft and which may be manipulated by the operator from the seat by means of a clutch shipping member 94. Secured to the outside end of the countershaft is a bevel pinion 95 that meshes with a corresponding pinion 96 secured to the front end of a longitudinally disposed shaft 97 that is journaled in a bearing member 98, having a forwardly extending curved arm 99 provided with a bearing member 100 that receives the end of the countershaft, and 101 represents a pin preventing displacement of the bearing member 100. 102 represents a coupling sleeve secured to the rear end of the shaft 97 and having its rear end splined to the front end of a shaft 103, having its rear end connected with the front end of the shaft 42 by means of universal coupling members 104, and 105 represents a two-wheeled truck carrying a rack bed 106, having its front end flexibly coupled, by means of a pin 107, with and supported by the draft frame 107¹ connected with the truck frame of the tractor.

The front end of the loader draft member 14 is pivotally connected with the draft frame of the tractor by means of a pin 108, and 109 represent lateral supports for the loader having their outside ends flexibly connected with the frame of the loader by means of eye members 110, and their opposite ends provided with hook members 111 whereby they may be detachably connected with eye members 112 carried by the wagon rack.

In operation, the tractor, with the trailing wagon and shock loader, is propelled along the shock row with the tines of the lifting fork running close to or upon the surface of the ground in position to pass under the shock, the operator presses down upon the crank arm 56 and thereby thrusts the friction clutch members 45 and 46 into engagement, the shaft 42 being rotated continuously through its operative connection with the power transmission gearing of the tractor, and with the clutch members in operative engagement, the shaft 25 carrying the winding drums 28 and 29 is rotated and the cables draw the fork with its load upward, and when the bracket members 15 and 16 rotate rearwardly in the ends of the channel bars 1 and 2, the fork is tilted upward and rearwardly in a manner to dump its load upon the receiving and deflecting cradle, from which the load slides to the wagon rack, the operator controlling the delivery angle of the cradle by means of the rope 75.

Having shown and described one embodiment of my invention, I do not wish that it be confined to the specific details of the structure as illustrated, it being understood that changes may be made in the form and organization of its various parts without departing from the spirit of the invention as indicated in the appended claims.

What I claim as my invention, and desire to secure by Letters Patent, is:

1. In combination, a motor propelled vehicle having a source of power thereon, a draft member carried thereby, a trailing vehicle connected to said draft member, a shock loader connected to said draft member and disposed at one side of said trailing vehicle, said shock loader including a shock engaging and hoisting fork, operative connections between said source of power and said shock hoisting fork, and a deflecting member carried by said loader and located in a position to receive the shock discharged by said fork and to deflect said shock into said trailing vehicle.

2. In combination, a motor propelled vehicle having a source of power thereon, a draft member carried by said vehicle, a trailing vehicle connected to said draft member, a shock loader connected to said draft member and disposed at one side of said trailing vehicle, said loader including a shock engaging and hoisting fork, operative connections between said source of power and said shock engaging and hoisting fork, and controlling means for said operative connections carried by said draft member and disposed in a position to be operated from said motor propelled vehicle.

3. In combination, a motor propelled vehicle having a source of power thereon, a draft member carried thereby, a trailing vehicle connected to said draft member, a shock loader connected to said draft member and located at one side of said motor propelled vehicle, said shock loader including a shock engaging and hoisting fork, operative connections between the source of power on said motor propelled vehicle and said shock engaging and hoisting fork, a deflecting member carried by said shock loader and disposed in a position to receive the shock discharged by said fork and to deflect the shock into said trailing vehicle, means for adjusting the position of said deflecting member, and means carried by said draft member for controlling the operative connections between the source of power and said fork.

In testimony whereof I affix my signature.

EDWARD W. BURGESS.